United States Patent
Hall et al.

(10) Patent No.: US 9,967,883 B2
(45) Date of Patent: May 8, 2018

(54) WIRELESS NETWORK NEGOTIATION AND OPTIMIZATION

(71) Applicants: David R. Hall, Provo, UT (US); Mark Hall, Springville, UT (US); Craig Boswell, Draper, UT (US); William H. Gillman, Salt Lake City, UT (US); Jedediah Knight, Provo, UT (US)

(72) Inventors: David R. Hall, Provo, UT (US); Mark Hall, Springville, UT (US); Craig Boswell, Draper, UT (US); William H. Gillman, Salt Lake City, UT (US); Jedediah Knight, Provo, UT (US)

(*) Notice: Subject to any disclaimer, the term of this patent is extended or adjusted under 35 U.S.C. 154(b) by 161 days.

(21) Appl. No.: 15/198,384

(22) Filed: Jun. 30, 2016

(65) Prior Publication Data

US 2018/0007691 A1    Jan. 4, 2018

(51) Int. Cl.
*H04W 72/04* (2009.01)
*H04W 4/02* (2018.01)
*H04W 52/36* (2009.01)

(52) U.S. Cl.
CPC ....... *H04W 72/0453* (2013.01); *H04W 4/025* (2013.01); *H04W 52/367* (2013.01)

(58) Field of Classification Search
CPC .................................................. H04W 72/04
See application file for complete search history.

(56) References Cited

U.S. PATENT DOCUMENTS

| | | | |
|---|---|---|---|
| 6,240,282 B1* | 5/2001 | Kleider | H04L 27/0012 375/285 |
| 2017/0230907 A1* | 8/2017 | Rose | H04B 1/44 |
| 2017/0245241 A1* | 8/2017 | Yu | H04W 68/02 |
| 2017/0332247 A1* | 11/2017 | Hua | H04W 16/18 |

\* cited by examiner

*Primary Examiner* — Zhiren Qin

(57) ABSTRACT

Methods for negotiating optimum parameters for communicating between a wireless control device and a wireless user device are disclosed. The methods generally include transmitting a frequency-hopped and spread negotiation signal using network-maximum parameters. The initial parameters make the negotiation signal long-range but low-data. The methods further include adjusting the initial parameters to optimal parameters based on a link budget and data rate requirements received in response to the negotiation signal. The signals are communicated on the 902-928 MHz unlicensed ISM band, and the parameters include spreading factor, output power, and carrier frequency channel bandwidth.

20 Claims, 5 Drawing Sheets

US 9,967,883 B2

WIRELESS NETWORK NEGOTIATION AND OPTIMIZATION

TECHNICAL FIELD

This invention relates generally to the field of the internet of things (IoT), and more specifically to negotiating and optimizing wireless IoT network connections.

BACKGROUND

Wireless IoT communication is the cutting edge of modern consumer and commercial electronics. However, some significant roadblocks stand in the way of IoT ubiquity. In particular, the limited range of current protocols, such as WiFi, Bluetooth, Z-Wave, and Zigbee, limit the applications of those networks, particularly in RF-noisy environments and applications that require long-range communication (which is further limited by government regulation). Additionally, different devices require different amounts of data to control those devices, and typical systems sacrifice range for speed. Thus, low-data devices are range limited by unnecessary data speed. This is especially the case for high-speed protocols such as WiFi, Bluetooth and Zigbee. Another issue facing IoT networks is FCC regulation. The FCC limits power output, and most protocols transmit at maximum power levels, significantly beyond what is necessary to have a stable link, wasting power and unnecessarily reducing battery life. Yet another issue facing IoT networks is that, typically, all listening devices have to process an entire data packet, or at the very least the preamble associated with the data packet, to determine whether that information is intended for those devices. The result is usually negative, and leads again to unnecessary power drain.

Protocols such as Z-wave attempt to address these issues by communicating on the low-data 900 MHz ISM band, but are still significantly range-limited. For example, even when fully meshed, the range of a Z-wave network is only 160 meters. This might be sufficient in some residential settings, but is certainly a significant limitation in commercial settings. Additionally, Z-wave and other similar protocols operate on a single frequency, and rely on time-division and other similar multiplexing to communicate with multiple devices. This makes these protocols especially susceptible to collisions and interference with other networks and devices, and requires additional data to secure communications, all of which increases the amount of data the needs to be transmitted and decreases range. The requirement for multiple hubs and/or devices to mesh and extend the network also increases costs associated with the network with only marginal improvements in range.

Other wireless networks, such as cellular networks, rely on large and expensive antenna arrays, with high power output and expensive high-gain receivers. Because of expense and regulatory limitations, such networks are not feasible for most, if not all, commercial IoT applications, and are certainly out of the question for private residential settings. Thus, despite efforts in the industry, significant problems still remain.

SUMMARY OF THE INVENTION

Methods for negotiating optimum parameters for communicating between a wireless control device and a wireless user device are disclosed. The methods generally include transmitting a frequency-hopped and spread negotiation signal using network-maximum parameters. The initial parameters make the negotiation signal long-range but low-data. The methods further include adjusting the initial parameters to optimal parameters based on a link budget and data rate requirements received in response to the negotiation signal. The signals are communicated on the 902-928 MHz unlicensed ISM band, and the parameters include spreading factor, output power, and carrier frequency channel bandwidth.

The methods improve on other IoT networks in a variety of ways. First, frequency-hopping and spreading increase the range of the network while decreasing collisions. Second, optimizing network connections for each device further limits collisions because signals intended for a particular device are range-limited to that device by the optimum parameters; devices outside the range do not hear the signal. Devices within the range have unique parameters, such as different spreading factor or channel bandwidth, that further limit the effects of collisions and interference. Finally, the network provides increased network security without consuming data because it is frequency-hopped.

In one embodiment, a method for negotiating a network connection with a user device is disclosed. The method includes transmitting a wireless frequency hopping spread spectrum (FHSS) network-negotiation signal using network initialization parameters. The initialization parameters include a network maximum spreading factor, a network maximum power, and a minimum carrier frequency channel bandwidth. The method further includes receiving, from the user device, a wireless FHSS response signal, in response to the network-negotiation signal. The response signal indicates a minimum link budget with the user device and a maximum data rate required to control the user device. The method also includes selecting optimum parameters for communicating with the user device based on the minimum link budget and the minimum data rate. The optimum parameters include an optimum spreading factor, an optimum power, and an optimum carrier frequency channel bandwidth. The method finally includes transmitting the optimum parameters to the user device using the network initialization parameters, and setting communication parameters for communication with the user device to the optimum parameters.

In another embodiment, a method for negotiating a network connection with a control device is disclosed. The method includes receiving, from the control device, a wireless FHSS network-negotiation signal and responding to the network-negotiation signal using network initialization parameters. The response indicates a minimum link budget with the control device and a maximum required data rate. The initialization parameters comprising a network maximum spreading factor, a network maximum power, and a minimum carrier frequency channel bandwidth. The method further includes receiving, from the control device, a wireless FHSS set signal communicating optimum parameters for communicating with the control device. The optimum parameters are based on the minimum link budget and the maximum required data rate, and include an optimum spreading factor, an optimum power, and an optimum carrier frequency channel bandwidth. Finally, the method includes setting communication parameters for communication with the control device to the optimum parameters.

BRIEF DESCRIPTION OF THE DRAWINGS

A more particular description of the invention briefly described above is made below by reference to specific embodiments. Several embodiments are depicted in drawings included with this application, in which.

DETAILED DESCRIPTION

A detailed description of the claimed invention is provided below by example, with reference to embodiments in the appended figures. Those of skill in the art will recognize that the components and steps of the invention as described by example in the figures below could be arranged and designed in a wide variety of different configurations without departing from the substance of the claimed invention. Thus, the detailed description of the embodiments in the figures is merely representative of embodiments of the invention, and is not intended to limit the scope of the invention as claimed.

In some instances, numerical values are used to describe features such as spreading factors, output power, bandwidths, link budgets, data rates, and distances. Though precise numbers are used, one of skill in the art recognizes that small variations the precisely stated values do not substantially alter the function of the feature being described. In some cases, a variation of up to 50% of the stated value does not alter the function of the feature. Thus, unless otherwise stated, precisely stated values should be read as the stated number, plus or minus a standard variation common and acceptable in the art.

Figure 1:
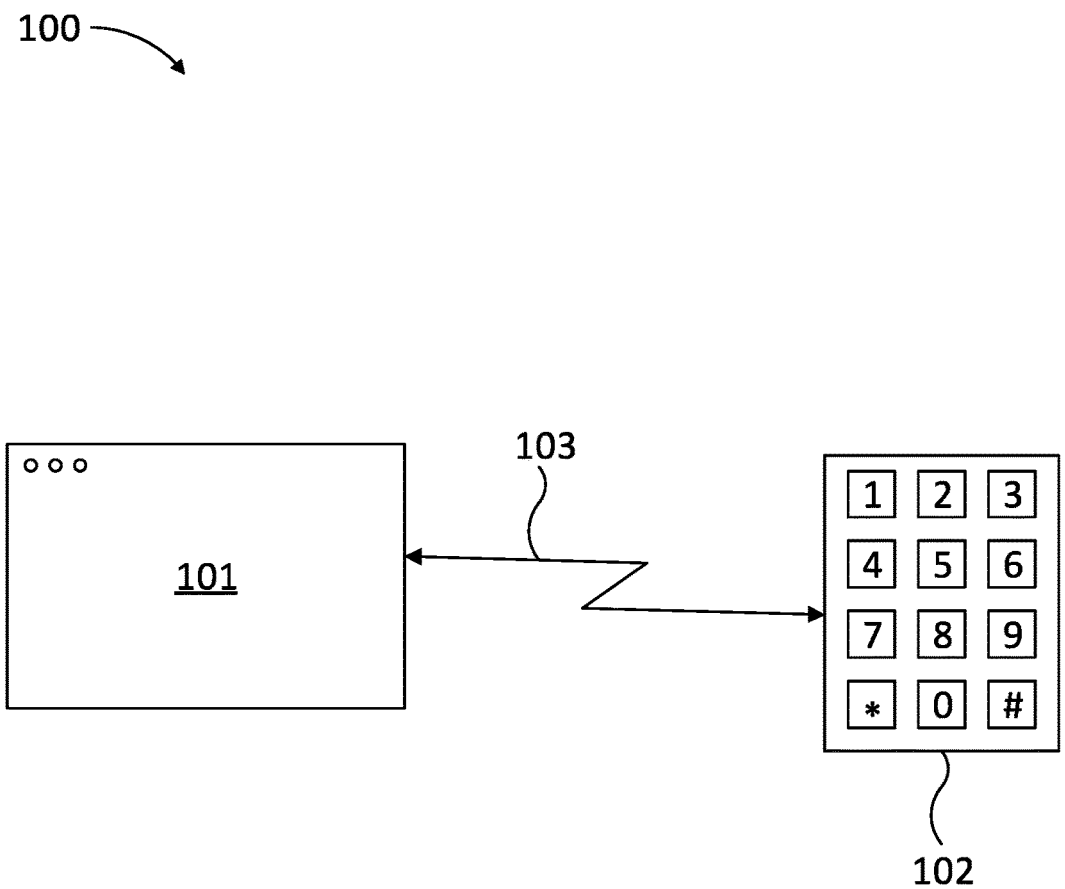
FIG. 1 depicts an example of a wireless IoT device controlled by a remote control hub.

FIG. 1 depicts an example of a wireless IoT device controlled by a remote control hub. Network 100 includes control device 101 communicating with user device 102 via wireless network-negotiation signal 103. Control device 101 includes hardware memory, hardware processors, and one or more transceivers. The transceivers have adjustable power output, adjustable channel bandwidth, and adjustable signal spreading. For example, in some embodiments, the transceivers each output from 0 to 1 W using one or more channel bandwidths ranging from 7 to 500 kHz, with a spreading factor ranging from 1 to 18. Additionally, in some embodiments, the transceivers are sensitive to as little as −150 dBm. In some embodiments, the processors, memory, and transceivers are implemented as modules, and control device 101 includes anywhere from 1 to 20 modules. Furthermore, in some embodiments, control device 101 includes one or more directional antennas and one or more batteries for primary or backup power when AC power is not being supplied.

Control device 101 controls user device 102 in any of a variety of ways. For example, in one embodiment, control device 101 authorizes operation of user device 102, such as authorizing access to a secure entry door. In another embodiment, control device 101 sends updates to control parameters for user device 102, such as updating a list of authorized PINs stored at an access pad. In yet another embodiment, control device 101 relays instructions to user device 102 from a cloud network or another user device such as a mobile phone, PC, or tablet. Furthermore, in some embodiments, control device 101 communicates a status of user device 102 with the cloud and/or other user devices. Control device 101 also, in some embodiments, ensures operability of network 100 when the Internet goes down by locally storing all information needed to keep network 100 and all networked devices operational.

User device 102, similar to control device 101, includes hardware memory and hardware processors. In some embodiments, the hardware memory and processors are implemented together in a microcontroller. User device 102 also includes a transceiver with adjustable power output, adjustable bandwidth, and adjustable spreading, all similar to the transceivers described above with regard to control device 101. Additionally, in some embodiments, user device 102 is battery-powered. Conversely, in some embodiments, user device 102 is connected to mains power. However, in some such embodiments, user device also includes a backup battery.

User device 102 is any of a variety of IoT devices. For example, user device 102 includes one or more of a door lock, an access pad, a room and/or exterior light, a ceiling fan, a motor for actuating a window covering, a garage door opener, any of a variety of home and office appliances, a thermostat for an HVAC system, a security system, or an asset location tag.

Wireless signals 103 includes frequencies on the unlicensed 902-928 MHz ISM band. Signals 103 are frequency-hopped and spread spectrum, with bandwidths ranging from 7 to 500 kHz, and spreading factors ranging from 1-18. Signals 103 are transmitted at a power ranging from 0 to 1 W, and the data speed ranges from 10 bit/sec to 500 kbit/sec. Some embodiments include incremental bandwidths of 7.8 kHz, 10.4 kHz, 15.6 kHz, 20.8 kHz, 31.25 kHz, 41.7 kHz, 62.5 kHz, 125 kHz, 250 kHz, and 500 kHz. In one specific embodiment, signals 103 are transmitted at 1 W and have a spreading factor of 12, a bandwidth of 500 kHz, and a data speed of 1,172 bit/sec.

Control device 101 communicates with user device 102 by negotiating optimal communication parameters. Control device 101 transmits a negotiation signal, and user device 102 responds. The response indicates a link budget and a required data rate for communication between the devices. Based on the link budget and data rate, control device 101 chooses optimum settings for the spreading factor, the carrier frequency channel bandwidth, and the power output. In some embodiments, power level is also chosen based on known position of other user devices and directionality of control device's 101 antennas. Additionally, in some embodiments, communication with user device 102 is assigned to a particular transceiver based on the greatest link budget of all control device 101 transceivers with user device 102.

In one specific embodiment, control device 101 negotiates with user device 102 using a spreading factor of 18, a bandwidth of 7 kHz, and a power of 1 W. User device 102 responds to control device 101, indicating a minimum required link budget of 161 dBm and a maximum required data speed of 1,172 bit/sec. Based on these requirements, control device 101 selects communication parameters for communication with user device 102 to a spreading factor of 12, a bandwidth of 500 kHz, and a transmission power of 1 W. Control device 101 transmits these settings to user device 102 using the initial settings, then sets the communication parameters to the optimum parameters. User device 102 receives the optimum parameters and sets communication parameters for communication with control device 101 to the optimum parameters.

Figure 2:
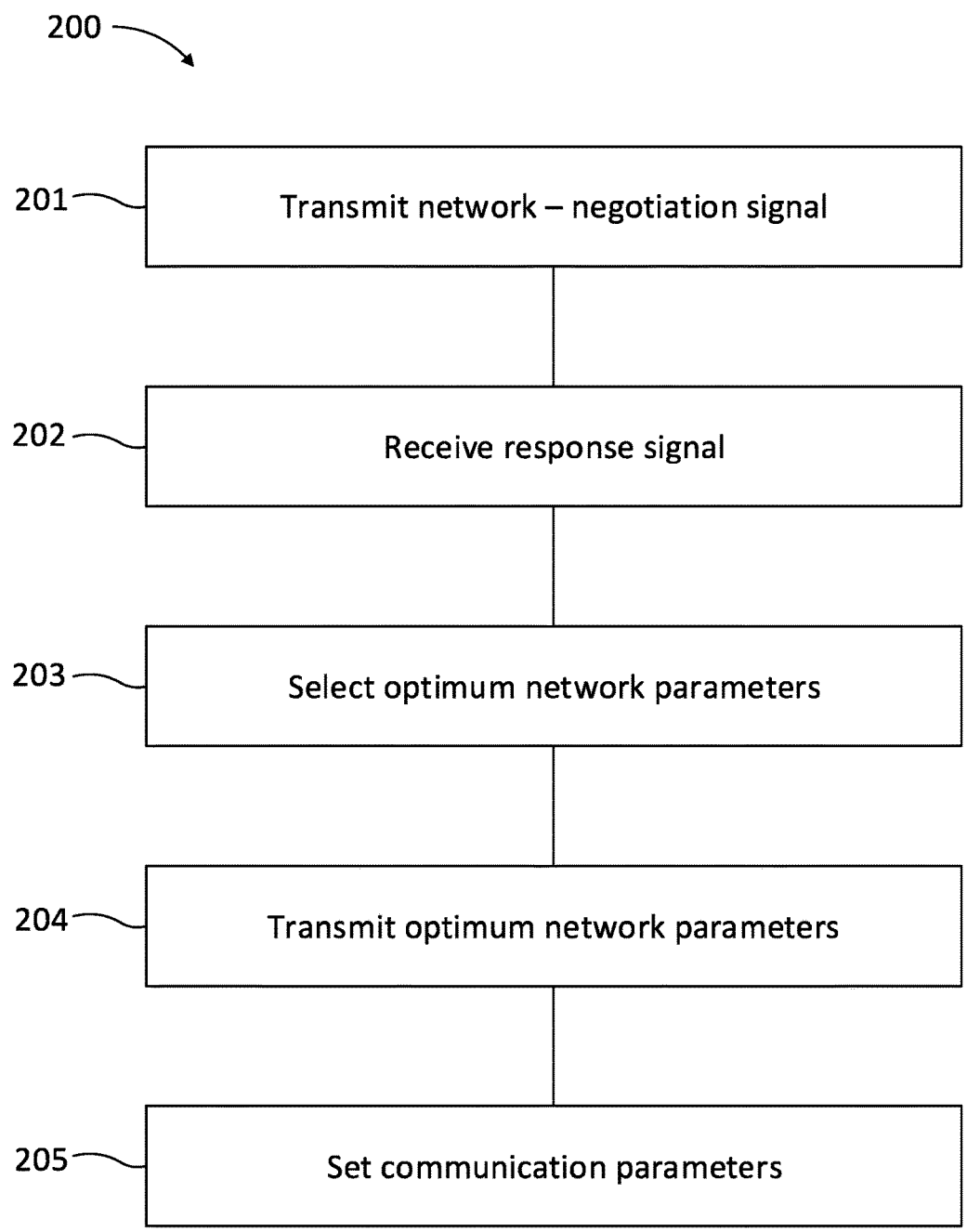
FIG. 2 depicts an example method for negotiating optimum communication parameters with a user device.

FIG. 2 depicts an example method for negotiating optimum communication parameters with a user device. Method 200 includes blocks 201 to 205. At block 201, a wireless FHSS network-negotiation signal is transmitted using network initialization parameters. The network initialization parameters include a network maximum spreading factor, a network maximum power, and a minimum carrier frequency channel bandwidth. At block 202, a wireless FHSS response signal is received from a user device in response to the network-negotiation signal. The response signal indicates a minimum link budget with the user device, and indicates a maximum data rate required to control the user device. At block 203, optimum parameters for communicating with the user device are selected based on the minimum link budget and the minimum data rate. The optimum parameters include an optimum spreading factor, an optimum power, and an optimum carrier frequency channel bandwidth. At block 204, the optimum parameters are transmitted to the user device using the network initialization parameters. At block 205, communication parameters for communication with the user device are set to the optimum parameters.

The spreading factors, powers and carrier frequencies are similar to those described above with regard to FIG. 1. Thus, one or more of the maximum spreading factor or the optimum spreading factor ranges from 1 to 18; one or more of the maximum power or the optimum power ranges from 1 dBm to 35 dBm; and one or more of the minimum carrier frequency channel bandwidth or the optimum carrier frequency bandwidth ranges from 500 kHz to 7 kHz. In one specific embodiment, the maximum spreading factor is 18, the maximum power is 1 W, or 30 dBm, and the minimum carrier frequency channel bandwidth is 7 kHz.

The link budget depends on output power, receiver sensitivity, signal spreading, bandwidth, range, and obstructions, among other things, and varies for each device. However, in general, the minimum link budget ranges from 1 dBm to 200 dBm. In some embodiments, the minimum link budget ranges from 142 dBm to 179 dBm.

The data rate is similar to that described above with regard to FIG. 1. Thus, in one embodiment, the minimum data rate ranges from 100 bit/sec to 500 kbit/sec. Maximum data rate varies by device, and is based on the largest number or bits that would be required to control the device in normal operation. For example, in one embodiment, the device is an access control pad. The control pad receives an access code input by a user, and sends the code to a control hub to authorize access. The data packet sent by the access pad to the control hub includes a preamble identifying the device, a payload identifying the type of request and including the access code, and a trailer that, in some embodiments, includes error correction data. The size of this data packet ranges from 72 to 2,040 bits, and includes some latency for processing. Users expect a response from an access control pad within 1-2 seconds, or sometimes within fractions of a second. Accounting for latency and transmission speed, the required data rate ranges from 200 bit/sec to 4000 bit/sec.

The data rate is determined by the spreading factor and the channel bandwidth; less spreading and wider bandwidth is associated with faster data transmission. However, less spreading and wider bandwidth are also associated with shorter range. Thus, devices that require faster data transmission are more range-limited than low-data devices. In the embodiment described above, a variety of carrier parameters will be sufficient to provide the required data rate. For example, in embodiments where the required data rate is 200 bit/sec and a Semtech SX1276 transceiver is employed, a spreading factor 9 and a 15.6 kHz bandwidth provide a 219 bit/sec data speed with a 159 dBm link budget at 0.25 W, or 20 dBm. At 1 W, the link budget is extended to 165 dBm. A spreading factor of 10 and a 31.25 kHz bandwidth provide a 244 bit/sec data speed, and a spreading factor of 11 and a 62.5 kHz bandwidth provide a 269 bit/sec data speed, both with a link budget of 158 dBm. This link budget translates to between ½ mile and 1 mile in a typical urban environment. Multiple devices with similar data speed and link budget requirements can be accommodated with minimal collision effects. Each device will also know immediately whether a signal is specified for it because it has to satisfy the right carrier parameters, specifically the right spreading factor and symbol per frequency rate. In embodiments where the required data rate is 4000 bit/sec, a spreading factor of 6 and a 62.5 kHz bandwidth provide a 4,688 bit/sec data speed with a link budget of 141 dBm at 0.25 W and 147 dBm at 1 W. A spreading factor of 10 and a 500 kHz bandwidth provide a 3,906 bit/sec data speed with a 143 dBm link budget at 0.25 W.

A variety of physical components, such as those described above with regard to FIG. 1, are used to execute method 200. Any of a variety of off-the-shelf hardware processors, hardware memory, and/or transceivers is suitable. For example, in one embodiment, a Microchip PIC24FJ256 microcontroller and Semtech SX1276 transceiver are employed by the control device to communicate with the user device.

Figure 3:
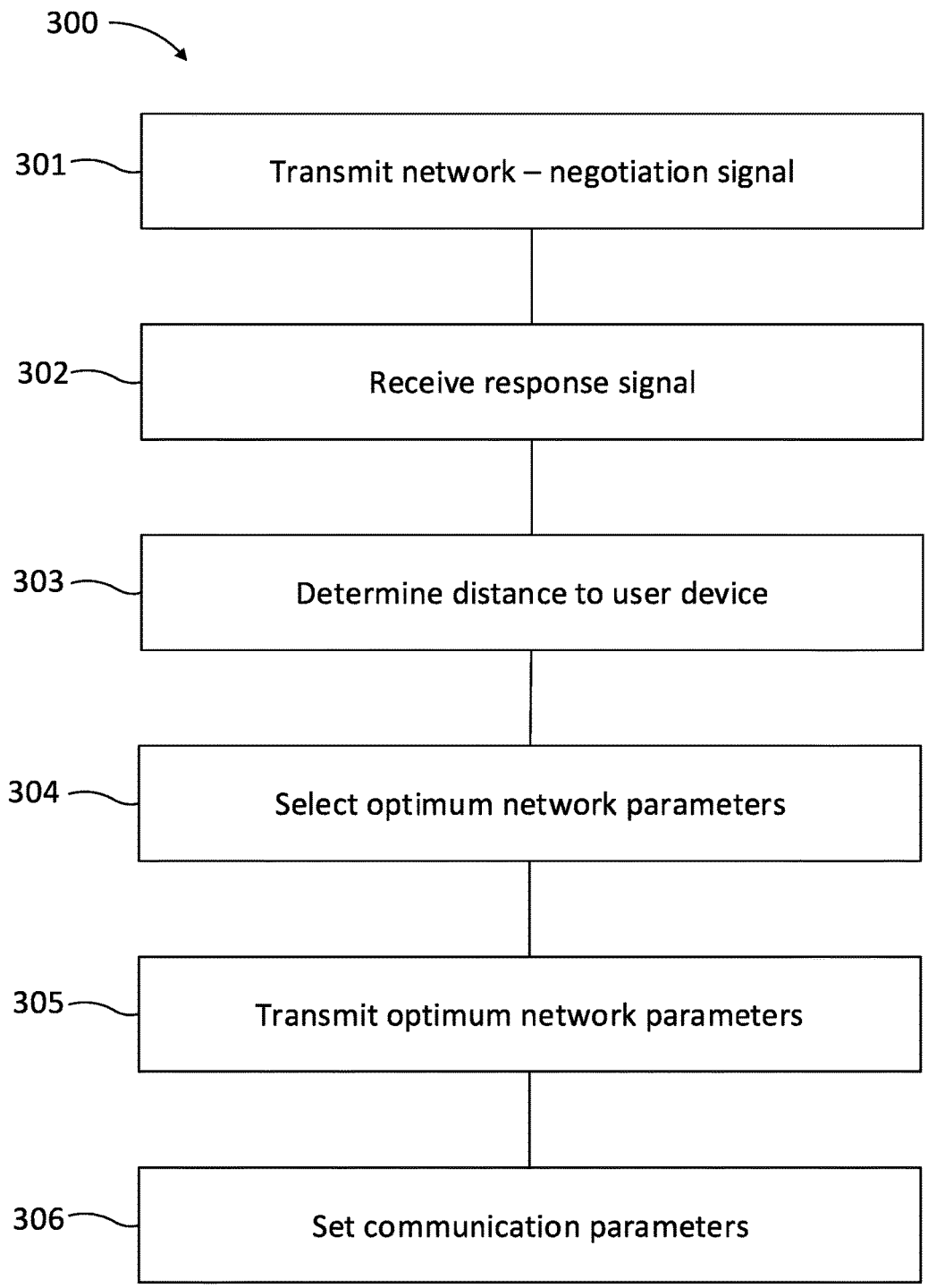
FIG. 3 depicts another example method for negotiating optimum communication parameters with a user device.

FIG. 3 depicts another example method for negotiating optimum communication parameters with a user device. Method 300 includes blocks 301-306. At block 301, a wireless FHSS network-negotiation signal is transmitted using network initialization parameters. The network initialization parameters include a network maximum spreading factor, a network maximum power, and a minimum carrier frequency channel bandwidth. At block 302, a wireless FHSS response signal is received from a user device in response to the network-negotiation signal. The response signal indicates a minimum link budget with the user device, and indicates a maximum data rate required to control the user device. At block 303, a distance to a user device is determined. At block 304, optimum parameters for communicating with the user device are selected based on the minimum link budget and the minimum data rate. The optimum parameters include an optimum spreading factor, an optimum power, and an optimum carrier frequency channel bandwidth. At block 305, the optimum parameters are transmitted to the user device using the network initialization parameters. At block 306, communication parameters for communication with the user device are set to the optimum parameters.

Blocks 301-302 and 304-306 are similar to blocks 201-205 described with regard to FIG. 2, and are accomplished in a similar manner and by similar components. Block 303 is accomplished in a variety of ways. The distance is programmed in the user device and sent as part of the response. The distance is determined by a round-trip time of flight from transmitting the negotiation signal to receiving the response. A processing latency is also required to adjust the measured time of flight to an actual time of flight. The processing latency is, in some embodiments, included in the response signal.

Knowing the distance is useful in determining optimum parameters when compared to known distances of other devices. Spreading factor, bandwidth, and power are, in some embodiments, chosen based on distance to reduce interference with signals sent to other devices. For example, in one embodiment, power is specifically tuned based on a device's distance from a control hub to avoid interference with devices farther away. In another embodiment, spreading factor and bandwidth are chosen so that devices closer to the hub have higher data speeds. Data packets for devices closer to the control hub have additional error correction bits to correct interference from signals transmitted to and sent by devices farther away. However, because of the higher data speeds, the overall control time for closer devices is the same if not less than devices farther from the control hub with smaller data packets.

Figure 4:
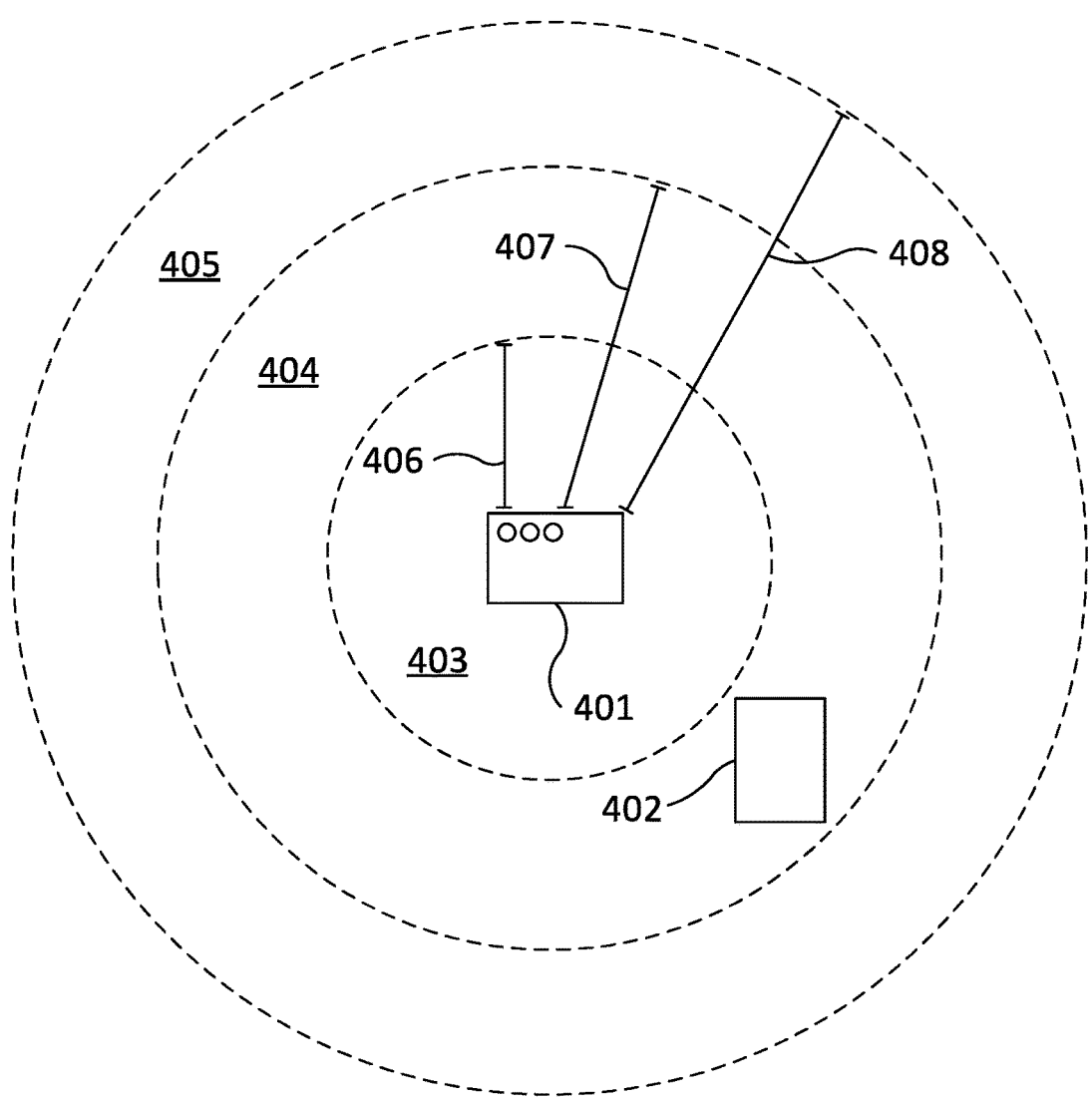
FIG. 4 depicts a wireless network with spreading factor zones.

FIG. 4 depicts a wireless network with spreading factor zones. System 400 includes control hub 401, user device 402, and communication zones 403, 404, 405 corresponding to ranges 406, 407, 408. Although three communication zones and ranges are depicted, some embodiments include more or fewer zones and ranges. Control hub 401 and user device 402 are similar to those described above with regard to FIGS. 1-3.

In some embodiments, communication zones 403, 404, 405 are spreading factor zones. All devices within a spreading factor zone communicate on the same spreading factor. For example, in some embodiments of method 300 described above, determining the distance comprises assigning user device 402 to one of a plurality of spreading factor zones. Each spreading factor zone is defined by a unique radius and a unique spreading factor for communicating with devices within the unique radius. In some such embodiments, a larger radius corresponds with a larger spreading factor. For example, in a specific embodiment, communication zone 403 corresponds to spreading factor 10, and range 407 is 1500 feet. Thus, all devices within 1500 feet of control hub 401 communicate using spreading factor 10. In the same embodiment, communication zone 404 corresponds to spreading factor 11, and range 408 is 3000 feet. Thus, all devices between 1500 and 3000 feet of control hub 401, such as device 402, communicate using spreading factor 11. Similarly, communication zone 405 corresponds to spreading factor 12, and range 409 is one mile. All devices between 3000 feet and 1 mile of control hub 401 communicate using spreading factor 12.

In other embodiments, communication zones 403, 404, 405 are channel bandwidth zones. All devices within a channel bandwidth zone communicate using the same bandwidth. For example, in some embodiments of method 300 described above, determining the distance comprises assigning the user device to one of a plurality of channel bandwidth zones. Each channel bandwidth zone is defined by a unique radius and a unique channel bandwidth for communicating with devices within the unique radius. In some such embodiments, a larger radius corresponds with a smaller channel bandwidth. For example, in a specific embodiment, communication zone 403 corresponds to a 500 kHz bandwidth, and range 407 is 1500 feet. Thus, all devices within 1500 feet of control hub 401 communicate using the 500 kHz bandwidth. In the same embodiment, communication zone 404 corresponds to a 250 kHz bandwidth, and range 408 is 3000 feet. Thus, all devices between 1500 and 3000 feet of control hub 401, such as device 402, communicate using the 250 kHz bandwidth. Similarly, communication zone 405 corresponds to a 125 kHz bandwidth, and range 409 is one mile. All devices between 3000 feet and 1 mile of control hub 401 communicate using spreading factor 12.

Figure 5:
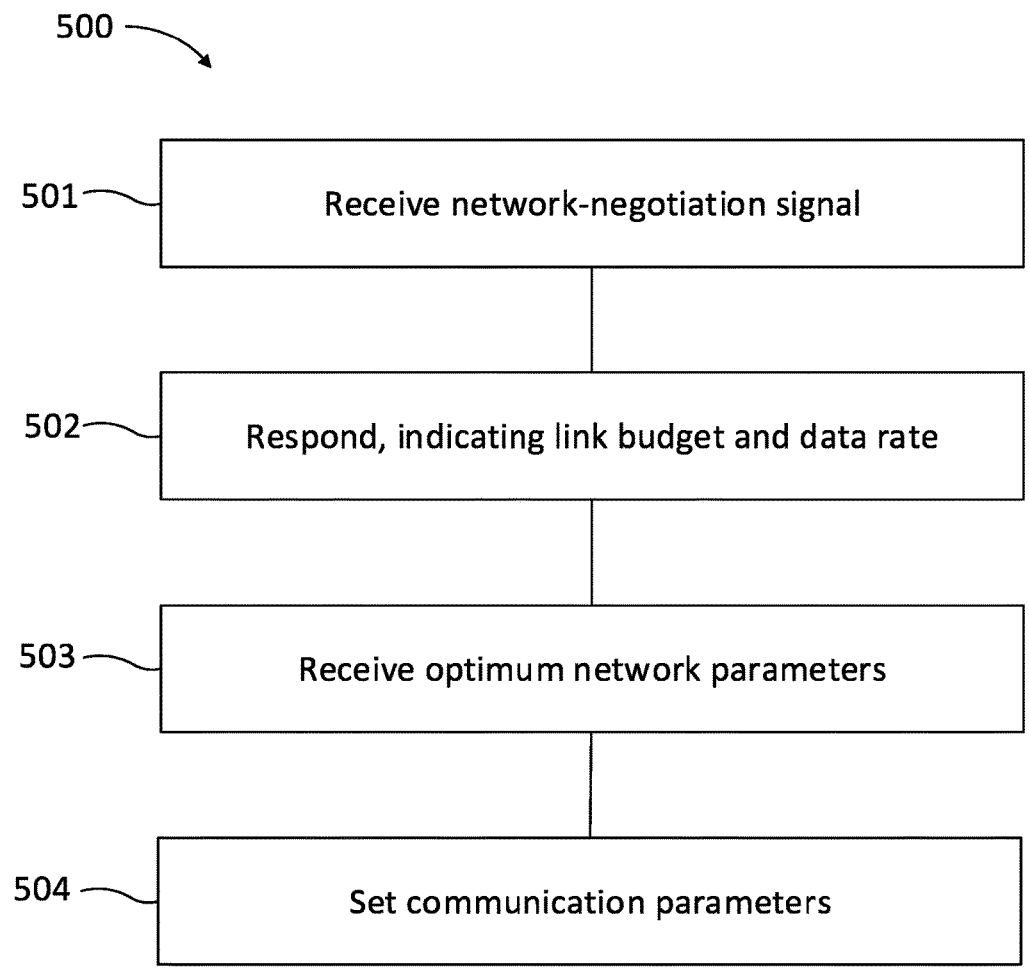
FIG. 5 depicts an example method for negotiating optimum communication parameters with a control device.

FIG. 5 depicts an example method for negotiating optimum communication parameters with a control device. At block 501, a wireless FHSS network-negotiation signal is received from the control device. At block 502, a response to the network negotiation signal is transmitted using network initialization parameters. The response indicates a minimum link budget with the control device and a maximum required data rate. The initialization parameters include a network maximum spreading factor, a network maximum power, and a minimum carrier frequency channel bandwidth. At block 503, a wireless FHSS set signal is received from the control device. The set signal communicates optimum parameters for communicating with the control device. The optimum parameters are based on the minimum link budget and the maximum required data rate, and include an optimum spreading factor, an optimum power, and an optimum carrier frequency channel bandwidth. At block 504, communication parameters for communicating with the control device are set to the optimum parameters.

The network initialization parameters and optimum parameters are similar to those described above with regard to FIGS. 1 and 3. However, where methods 100, 300 are performed by a control device, or a device that initiates negotiation with another device, method 500 is implemented by a device receiving a request to negotiate optimum parameters. For example, in one embodiment, method 500 is performed at a user device in response to a request to negotiate optimum parameters sent by the control device.

The invention claimed is:

1. A method comprising:
transmitting a wireless frequency hopping spread spectrum (FHSS) network-negotiation signal using network initialization parameters, wherein the initialization parameters comprise a network maximum spreading factor, a network maximum power, and a minimum carrier frequency channel bandwidth;
receiving, from a user device, a wireless FHSS response signal, in response to the network-negotiation signal, indicating a minimum link budget with the user device, and indicating a maximum data rate required to control the user device;
selecting optimum parameters for communicating with the user device based on the minimum link budget and the minimum data rate, wherein the optimum parameters comprise an optimum spreading factor, an optimum power, and an optimum carrier frequency channel bandwidth;
transmitting the optimum parameters to the user device using the network initialization parameters; and
setting communication parameters for communication with the user device to the optimum parameters.

2. The method of claim 1, wherein one or more of the maximum spreading factor or the optimum spreading factor ranges from 1 to 18.

3. The method of claim 1, wherein one or more of the maximum power or the optimum power ranges from 1 dBm to 35 dBm.

4. The method of claim 1, wherein one or more of the minimum carrier frequency channel bandwidth or the optimum carrier frequency bandwidth ranges from 500 kHz to 7 kHz.

5. The method of claim 1, wherein the maximum spreading factor is 18, the maximum power is 1 W, and the minimum carrier frequency channel bandwidth is 7 kHz.

6. The method of claim 1, wherein the minimum link budget ranges from 0 dBm to 170 dBm.

7. The method of claim 1, wherein the minimum data rate ranges from 100 bit/sec to 500 kbit/sec.

8. The method of claim 1, further comprising determining a distance to the user device.

9. The method of claim 1, wherein selecting the optimum parameters is further based on the distance.

10. The method of claim 9, wherein determining the distance comprises assigning the user device to one of a plurality of spreading factor zones, wherein each spreading factor zone is defined by a unique radius and a unique spreading factor for communicating with devices within the unique radius.

11. The method of claim 10, wherein a larger radius corresponds with a larger spreading factor.

12. The method of claim 9, wherein determining the distance comprises assigning the user device to one of a plurality of channel bandwidth zones, wherein each channel bandwidth zone is defined by a unique radius and a unique channel bandwidth for communicating with devices within the unique radius.

13. The method of claim 12, wherein a larger radius corresponds with a smaller channel bandwidth.

14. A method comprising:
   receiving, from a control device, a wireless frequency hopping spread spectrum (FHSS) network-negotiation signal;
   responding to the network-negotiation signal using network initialization parameters and indicating a minimum link budget with the control device and a maximum required data rate, wherein the initialization parameters comprising a network maximum spreading factor, a network maximum power, and a minimum carrier frequency channel bandwidth;
   receiving, from the control device, a wireless FHSS set signal communicating optimum parameters for communicating with the control device, wherein the optimum parameters are based on the minimum link budget and the maximum required data rate, and wherein the optimum parameters comprise an optimum spreading factor, an optimum power, and an optimum carrier frequency channel bandwidth; and
   setting communication parameters for communication with the control device to the optimum parameters.

15. The method of claim 14, wherein one or more of the maximum spreading factor or the optimum spreading factor ranges from 1 to 18.

16. The method of claim 14, wherein one or more of the maximum power or the optimum power ranges from 10 dBm to 30 dBm.

17. The method of claim 14, wherein one or more of the minimum carrier frequency channel bandwidth or the optimum carrier frequency bandwidth ranges from 500 kHz to 7 kHz.

18. The method of claim 14, wherein the maximum spreading factor is 18, the maximum power is 1 W, and the minimum carrier frequency channel bandwidth is 7 kHz.

19. The method of claim 14, wherein the minimum link budget ranges from 0 dBm to 170 dBm.

20. The method of claim 14, wherein the required data rate ranges from 100 bit/sec to 500 kbit/sec.

* * * * *